United States Patent Office 3,159,764
Patented Dec. 1, 1964

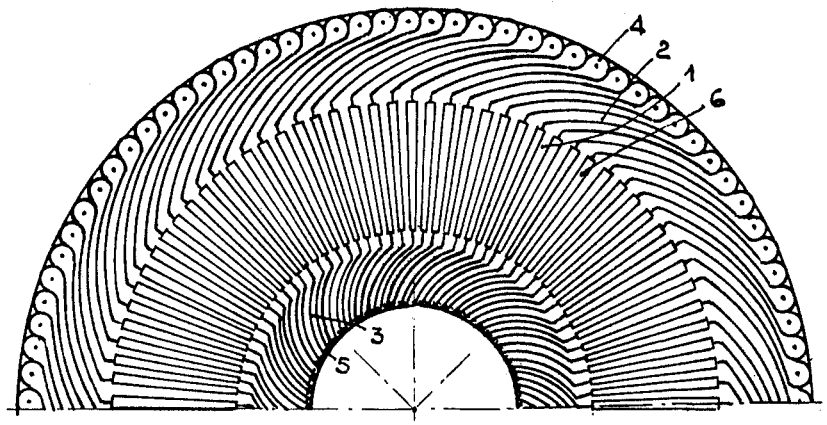
FIG.1
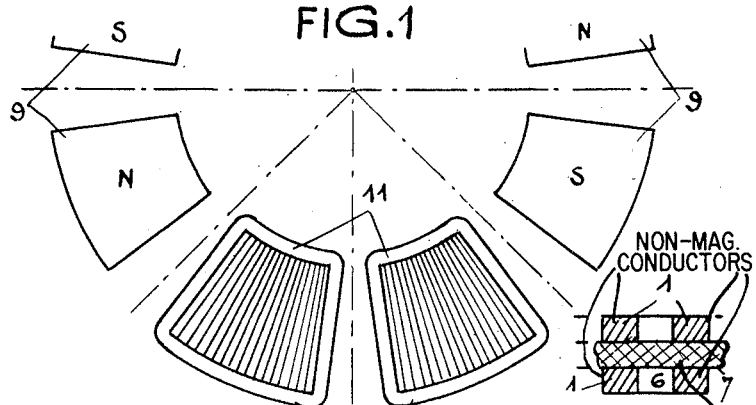
FIG.5 FIG.2 FIG.3
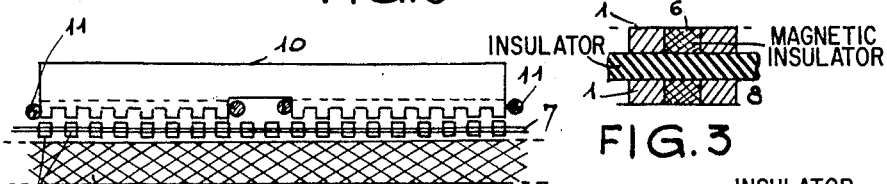
FIG.6 FIG.4
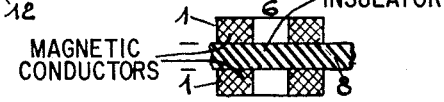

3,159,764
A.C. SYNCHRONIZED ELECTRIC ROTARY
MACHINES
Jacques Henry-Baudot, Antony, France, assignor to
Printed Motors Inc., New York, N.Y.
Filed Aug. 6, 1962, Ser. No. 215,067
Claims priority, application France, Sept. 8, 1961,
872,808, Patent 1,318,612
11 Claims. (Cl. 310—268)

The present invention concerns improvements in or relating to axial airgap electric rotary machines comprising an armature made of a two-face printed circuit on an annular insulating carrier to which, when required, a conductive damping ring may be associated, and also including a field arrangement of at least one ring of permanent magnets on one face of the airgap within which said armature is rotatable. Such machines are for instance disclosed in my co-pending application Serial No. 1128, filed January 7, 1960.

In such machines, the magnitude of the motor torque is quite low since no iron slots are present in the armature and the speed without a load does not substantially depend upon the supply voltage due to the damping of the armature. However, if fast variations in speed are thus eliminated, there remain slow variations of speed, of the nature of a drift, which could only be eliminated by special provisions of the supply control arrangement and which thus led to relatively complicated circuitry for such control.

It is an object of the invention to provide an improved machine of the above defined kind whereby all drifts or slow variations of speed are substantially eliminated with the sole recourse to an external stabilized A.C. supply.

According to the invention, a D.C. electric rotary machine comprising a disc-shaped printed-circuit armature within a magnetic airgap, one face of which at least is defined by a ring of permanent magnets, is characterized in that the winding conductors of the armature are, at least on the face of the armature facing the said magnet ring, formed over at least part of their lengths with relative spacings substantially equal to their own widths, so that magnetic and non-magnetic equal areas alternate in said armature on said face, and at least one pair of mgnetic poles in said ring are replaced by two toothed magnetic members, each carrying one phase winding of a synchronizing A.C. winding. The teeth and the armature conductors on said face are of identical pitch and preferably said teeth and the parts of said conductors facing them are substantially radially orientated.

These and further features will be described in full detail with reference to the accompanying drawings, wherein FIG. 1 shows a half-front view of an illustrative embodiment of the armature for machines according to the invention;

FIG. 2 shows a partial cross-section of such armature;

FIGS. 3 and 4 show modifications of the cross-section of such armature;

FIG. 5 shows a half front view of the field arrangement in an illustrative embodiment thereof for cooperation with the armature of FIG. 1; and FIG. 6 shows a diagrammatically represented partial cross-section of a linear development of the machine portion wherein are located the toothed members in substitution for permanent magnet poles.

The winding shown in FIG. 1 is of the series-wave type, which is of special advantage since, for such a series-wave winding, there is no substantial loss of efficiency of a machine when one or more pairs of magnetic poles are suppressed or omitted in the field arrangement thereof. The winding comprises two sets of half-turn conductors bonded throughout their lengths to the faces of an annular insulating carrier, the ends of the half-turn conductors being in registering relation from one face to the other one of the carrier and being connected, for instance, by means of plated holes through each pair of registering ends and through said carrier. Each half-turn conductor comprises a substantially radial portion 1 extended at both ends by arcuate or slanted portions 2 and 3, themselves ending in terminal portions 4 and 5 wherethrough are established the said plated holes. Such an armature winding may be made, as known, by any suitable so-called "printed-circuit techniques." The insulating carrier is shown at 7 in FIG. 2 as being of magnetic insulating material such as, for instance, coercive ferrite material. Such carrier may alternatively be non-magnetic as shown at 8 in FIGS. 3–4.

The end portions of the half-turn conductors are preferably made contiguous (except for a small gap between adjacent conductors), because such end portions, which do not play a substantial part in the electromagnetic induction process in the machine, may advantageously be of as great a cross-section as possible for reducing the ohmic loss thereof, and consequently, reducing the ohmic losses in the winding. The inner end-portions further could hardly be made with substantial intervals therebetween because of the reduced area available at this place of the winding carrier. The radial portions of the conductors are made of a width so restricted, as shown, that they are separated on the carrier by intervals 6 of a width equal to their own width, at least approximately. When the carrier 7, FIG. 2 is made of a magnetic material, these intervals 6 between the conductors are left bare as the magnetic material is apparent in such intervals between the copper of the conductors. When the carrier material is not magnetic, these intervals may be filled with magnetic material as shown in FIG. 3. Or else, the carrier, when magnetic, may be engraved for forming protruding teeth between the intervals in which are formed the conductors 1. The final condition to obtain being a due alternation of magnetic and non-magnetic materials on the face of the armature. It is also possible to make the conductors in a material which is both conductive and magnetic and to place the conductors within depressions of an insulating non-magnetic carrier, as shown in FIG. 4. It must be noted or emphasized that, due to the very small thickness of the printed conductors, no iron slot effect is obtained in such armatures so that the magnetic flux modulation remains quite negligible in normal operation of the machine.

The other face of the winding member may be identical to that shown; of course, the orientations of the slanted conductor portions will appear reversed with respect to the first winding face. Brushes, not shown for simplification of the drawing, bear on one of the slanted portion sets on one face of the armature.

A field structure cooperates with the armature in the machine. Part of said field arrangement is shown in FIG. 5. Said field arrangement has eight poles, six of which are made of permanent magnets 9 which alternate in polarities around the ring of poles. The radial height of the poles is substantially equal to the radial height of the middle or radial portions 1 of the armature conductors. Two of the permanent-magnet poles are omitted and in substitution therefor are provided two sets of teeth integral with a yoke 10 of magnetic material; each set of teeth carries a coil 11 and said coils 11 must be understood as being serially connected together and in series with an A.C. supply (not shown) so that the phases or polarities produced by the coils 11 appear opposite from one set of teeth to the other one. Such an arrangement is shown also in developed form on FIG. 6 in order better to define it. The width and the pitch of said teeth may be, in either set, substantially the same as are the width and intervals of the magnetic and non-magnetic portions in the armature winding.

Such a field arrangement may be provided on both sides of the armature, both sides of which are in such a case imperatively as shown in FIG. 1. The A.C. supplied coils will be in series or parallel relation with respect to the A.C. supply terminals as wanted by the user, from one side to the other one. In a modification, as shown in FIG. 6, a field arrangement is only provided on one side of the armature and on the other side is placed a mere magnetic ring 12 acting as a yoke for closing therethrough the magnetic flux lines passing through the armature. When two field arrangements are provided on opposite sides of the armatures, of course their magnetic polarities of magnets are reversed from one side of the armature to the other one.

More than one pair of permanent magnet poles may be omitted and replaced by toothed sets when required. With a series-wave winding, the motor will operate up to a single pair of magnetic poles. Of course, the electromotive force and consequently the torque are reduced when reducing the number of pairs of permanent field magnets, but no deleterious lack of symmetry occurs within the armature from such reductions of pairs of permanent magnet field poles. In the illustrated example, the electromotive force is reduced in the ratio of 8 to 6 since the normal number of poles is 8 and there only remain six active poles in the arrangement.

The teethed member, together with the portion of the armature winding wherein magnetic and non-magnetic areas alternate, constitutes a phonic wheel element which ensures the synchronization of the rotation of the machine under the control of the frequency of the A.C. supply in the coils 11: for N teeth and for a frequency of the A.C. supply equal to F, the synchronous speed of rotation is $V=2F/N$ r.p.s. The motor torque is the sum of the torque resulting from the D.C. supply of the armature and of the torque resulting from the A.C. supply of the incorporated phonic wheel element. The direction and value of this A.C. produced torque depend on the relative phase between the teeth of the member 10 and the alternate magnetic and non-magnetic areas in the armature, when the field flux is maximum. As the synchronizer arrangement may either absorb some excess of torque or on the other hand supply some excess of torque (when the speed tends to slow under the action of a load), the slow speed variations are substantially eliminated and further the damping of the rotary armature may be highly reduced so that it will become unnecessary to provide an eddy current ring embodied in the armature for the required damping, as it was previously provided in such kind of machines.

I claim:

1. An axial airgap electric rotary machine comprising the combination of a disc-type armature, and a field pole ring mounted concentric with said armature and on one side thereof, said armature carrying an annular winding formed of two sets of thin and flat conductors carried on opposite faces of said armature, the winding conductors on the side of the armature facing said pole ring having straight portions arranged radially of said armature and being spaced apart by intervals substantially equal to their width, said conductor portions and intervals defining alternate substantially radially extending areas of distinct magnetic properties, said pole ring having at least a pair of adjacent sectors thereof magnetized in opposite polarities by permanent magnet means, and at least one pair of magnetic pole members embodied in adjacent sectors of said ring and having their pole faces slotted to present spaced radially extending teeth facing said armature, and a magnetizing coil surrounding each slotted pole member, said coils being connected to a source of alternating current for magnetization in opposite polarities.

2. An axial airgap electric rotary machine comprising the combination of a disc-type armature having a two-faced printed-circuit winding formed on opposite faces thereof, the winding conductors on at least one face having substantially radial parts spaced apart by intervals substantially equal to their width, said conductor parts and said intervals being of different magnetic characters, means for energizing said armature winding from a source of direct current, and a stationary field pole ring facing said one face of the armature and comprising at least one pair of magnetic pole members having substantially radial teeth on the side of said ring facing said armature and at least one pair of permanent magnet poles of opposite polarities, and a magnetizing coil surrounding each toothed pole member, said coils being connected to a source of alternating current for magnetization in opposite polarities.

3. An axial airgap electric rotary machine comprising a disc-type armature having a two-faced printed-circuit winding wherein the conductors of the winding are distributed along annular winding bands on opposite faces of a disc-shaped carrier, and a stationary field pole ring facing one face of said armature and comprising at least one pair of permanent magnet poles of opposite polarities, said armature having an arrangement of substantially radial areas of different magnetic properties on one face of said armature facing said field pole ring, said pole ring having at least two sets of substantially radial magnetic teeth, each set of teeth being surrounded by an A.C. energized coil, and said coils being connected in relative phase opposition with respect to said A.C. supply.

4. An axial airgap electric rotary machine according to claim 3, wherein said arrangement of substantially radial areas of different magnetic properties regularly alternating along the said one face of the armature comprises parts of the winding conductors distributed around said winding band and the intervals between said conductor parts.

5. An axial airgap electric rotary machine according to claim 4, wherein the said conductor parts are non-magnetic and the intervals therebetween are filled with magnetic material.

6. An axial airgap electric rotary machine according to claim 4, wherein the said conductor parts are magnetic and the intervals therebetween are filled with non-magnetic insulating material.

7. An axial airgap electric rotary machine according to claim 4, wherein the said conductor parts are spaced apart and are non-magnetic and are bonded to a carrier of magnetic insulating material.

8. An axial airgap electric rotary machine according to claim 4, wherein said areas of different magnetic properties are made flush on said one face of the armature.

9. An axial airgap electric rotary machine according to claim 3, wherein on the opposite side of the armature from said pole ring is a further stationary member closing the magnetic flux passing through the said armature.

10. An axial airgap electric rotary machine according to claim 3, wherein on the opposite side of the armature from said pole ring is a further stationary field pole ring also comprising at least one pair of permanent magnet field poles and at least one pair of A.C. energized magnetic toothed member poles.

11. An axial airgap electric rotary machine according to claim 4, wherein each of the said winding conductors comprises a substantially radial intermediate portion extended at both ends by slanted portions, said intermediate portions being relatively spaced apart by intervals substantially equal to their width, and said slanted portions being contiguous at least in the inner portion of said winding bands.

No references cited.